US 11,287,827 B2

United States Patent
Berkemeier et al.

(10) Patent No.: US 11,287,827 B2
(45) Date of Patent: Mar. 29, 2022

(54) VISUAL OBJECT TRACKER

(71) Applicant: Continental Automotive Systems, Inc., Auburn Hills, MI (US)

(72) Inventors: Matthew Donald Berkemeier, Beverly Hills, MI (US); Danny Bynum, Auburn Hills, MI (US); Xin Yu, Troy, MI (US); Dhiren Verma, Farmington Hills, MI (US)

(73) Assignee: Continental Automotive Systems, Inc., Auburn Hills, MI (US)

(*) Notice: Subject to any disclaimer, the term of this patent is extended or adjusted under 35 U.S.C. 154(b) by 249 days.

(21) Appl. No.: 16/407,074

(22) Filed: May 8, 2019

(65) Prior Publication Data
US 2019/0346856 A1 Nov. 14, 2019

Related U.S. Application Data

(60) Provisional application No. 62/680,285, filed on Jun. 4, 2018, provisional application No. 62/668,639, filed on May 8, 2018.

(51) Int. Cl.
G05D 1/02 (2020.01)
G06T 7/246 (2017.01)
B60D 1/36 (2006.01)

(52) U.S. Cl.
CPC ............ *G05D 1/0246* (2013.01); *B60D 1/36* (2013.01); *G05D 1/027* (2013.01); *G05D 1/0212* (2013.01); *G05D 1/0257* (2013.01); *G05D 1/0278* (2013.01); *G06T 7/248* (2017.01);
(Continued)

(58) Field of Classification Search
None
See application file for complete search history.

(56) References Cited

U.S. PATENT DOCUMENTS 9,880,560 B2 * 1/2018 Han ................... B60R 11/04
2019/0122053 A1   4/2019 Erfurth
2019/0258874 A1 * 8/2019 Zhang ................ B60R 1/00

FOREIGN PATENT DOCUMENTS

DE   4413694 A1    10/1995
DE   102004043761 A1  3/2006
DE   102016210376 A1 12/2016
(Continued)

OTHER PUBLICATIONS

Neel Joshi, 'Image Deblurring using Inertial Measurement Sensors', Jul. 2010 (Year: 2010).*
(Continued)

*Primary Examiner* — Jonathan M Dager
*Assistant Examiner* — Garrett F Evans

(57) ABSTRACT

A method for tracking a trailer coupler positioned behind a tow vehicle is provided. The method includes receiving one or more images from a camera positioned on a back portion of the tow vehicle. The method also includes determining a trailer coupler position within the one or more images. The trailer coupler position associated with the trailer coupler. Additionally, the method includes receiving vehicle sensor data from one or more vehicle sensors. The method includes determining vehicle motion data based on the received vehicle sensor data. The method also includes determining an updated coupler position based on the trailer coupler position and the vehicle motion data.

14 Claims, 6 Drawing Sheets

(52) U.S. Cl.
CPC .............. *G05D 2201/0213* (2013.01); *G06T 2207/30252* (2013.01)

(56) References Cited

FOREIGN PATENT DOCUMENTS

| | | |
|---|---|---|
| DE | 102017219119 A1 | 4/2019 |
| GB | 2513393 A | 10/2014 |
| WO | 2015074016 A1 | 5/2015 |
| WO | 2016155919 A1 | 10/2016 |
| WO | 2016164118 A2 | 10/2016 |

OTHER PUBLICATIONS

International Search Report and the Written Opinion of the International Searching Authority dated Jul. 26, 2019 for the counterpart PCT Application No. PCT/US2019/031378.
Japanese Office Action dated Dec. 6, 2021 for the counterpart Japanese Patent Application No. 2020-562603.

* cited by examiner

VISUAL OBJECT TRACKER

CROSS REFERENCE TO RELATED APPLICATIONS

This U.S. patent application claims priority under 35 U.S.C. § 119(e) to U.S. Provisional Application 62/668,639, filed on May 8, 2018, and U.S. Provisional Application 62/680,285, filed on Jun. 4, 2018, which are hereby incorporated by reference in their entirety.

TECHNICAL FIELD

This disclosure relates to a method and system for a visual object tracking system supported by a tow vehicle. The visual object tracking system tracks a coupler of a trailer positioned behind the tow vehicle.

BACKGROUND

Trailers are usually unpowered vehicles that are pulled by a powered tow vehicle. A trailer may be a utility trailer, a popup camper, a travel trailer, livestock trailer, flatbed trailer, enclosed car hauler, and boat trailer, among others. The tow vehicle may be a car, a crossover, a truck, a van, a sports-utility-vehicle (SUV), a recreational vehicle (RV), or any other vehicle configured to attach to the trailer and pull the trailer. The trailer may be attached to a powered vehicle using a trailer hitch. A receiver hitch mounts on the tow vehicle and connects to the trailer hitch to form a connection. The trailer hitch may be a ball and socket, a fifth wheel and gooseneck, or a trailer jack. Other attachment mechanisms may also be used.

Recent advancements in computing and sensor technology have led to improved vehicle autonomous driving. As such, it is desirable to have a tow vehicle capable of autonomously driving in a rearward direction towards a trailer positioned behind the tow vehicle, so that the tow vehicle is positioned to attach to the trailer.

SUMMARY

One aspect of the disclosure provides a method for tracking a trailer coupler positioned behind a tow vehicle. The method includes receiving, at data processing hardware, one or more images from a camera positioned on a back portion of the tow vehicle and in communication with the data processing hardware. The method also includes determining, at the data processing hardware, a trailer coupler position within the one or more images. The trailer coupler position is associated with the trailer coupler. The method also includes receiving, at the data processing hardware, vehicle sensor data from one or more vehicle sensors in communication with the data processing hardware. The method also includes determining, at the data processing hardware, vehicle motion data based on the received vehicle sensor data. The method also includes determining, at the data processing hardware, an updated coupler position based on the trailer coupler position and the vehicle motion data.

Implementations of the disclosure may include one or more of the following optional features. In some implementations, the vehicle motion data includes a vehicle pose, a vehicle linear speed, and a vehicle angular speed. The one or more vehicle sensors may include at least one of a steering wheel angle sensor, wheel encoders, inertial measuring unit, radar, and global positioning system receiver.

In some examples, the method further includes determining a pixel velocity of the trailer coupler within the one or more images based on the vehicle motion data and a previous coupler position. The updated coupler position may be based on the pixel velocity and the previous coupler position. The pixel velocity may also be based on a coupler height in a real-world coordinate system.

In some implementations, the method further includes determining the coupler height from a predetermined range. The method may also include determining a first pixel point location associated with the trailer coupler based on the pixel velocity. The method may also include determining a second pixel point location associated with the trailer coupler based on the one or more images. The method may also include comparing the first pixel point location and the second pixel point location. The method may also include adjusting the coupler height based on the compared first and second pixel point locations. In some examples, the method includes storing, at memory hardware in communication with the data processing hardware, the updated coupler position. The method may also include retrieving the updated coupler position as the previous coupler position when one or more updated images are received.

In some implementations, the method further includes determining a coupler location in a world coordinate based on the updated coupler position. The method may also include transmitting instructions to a drive system of the tow vehicle. The instructions causing the tow vehicle to autonomously maneuver in a rearward direction towards the coupler location.

Another aspect of the disclosure provides a system for tracking a trailer coupler positioned behind a tow vehicle. The system includes: data processing hardware; and memory hardware in communication with the data processing hardware. The memory hardware stores instructions that when executed on the data processing hardware cause the data processing hardware to perform operations that include the method described above.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

A tow vehicle, such as, but not limited to a car, a crossover, a truck, a van, a sports-utility-vehicle (SUV), and a recreational vehicle (RV) may be configured to tow a trailer. The tow vehicle connects to the trailer by way of a trailer hitch that includes a coupler and a tow bar. It is desirable to have a tow vehicle that is capable of tracking the trailer coupler and autonomously maneuvering towards the trailer in a rearward direction. An object tracking computer vision algorithm typically relies on visual information to predict a location of an object in future images. Although past motions of the object in the image are some indicator of future positions, changes in camera direction may confuse the object tracking computer vision algorithm and cause the object tracking computer vision algorithm to lose its fix on the object. As such, a tracking system that relies on camera motion in addition to the position of the coupler in previously captured images reduces the chance of losing the location of the object in future images.

Figure 1:
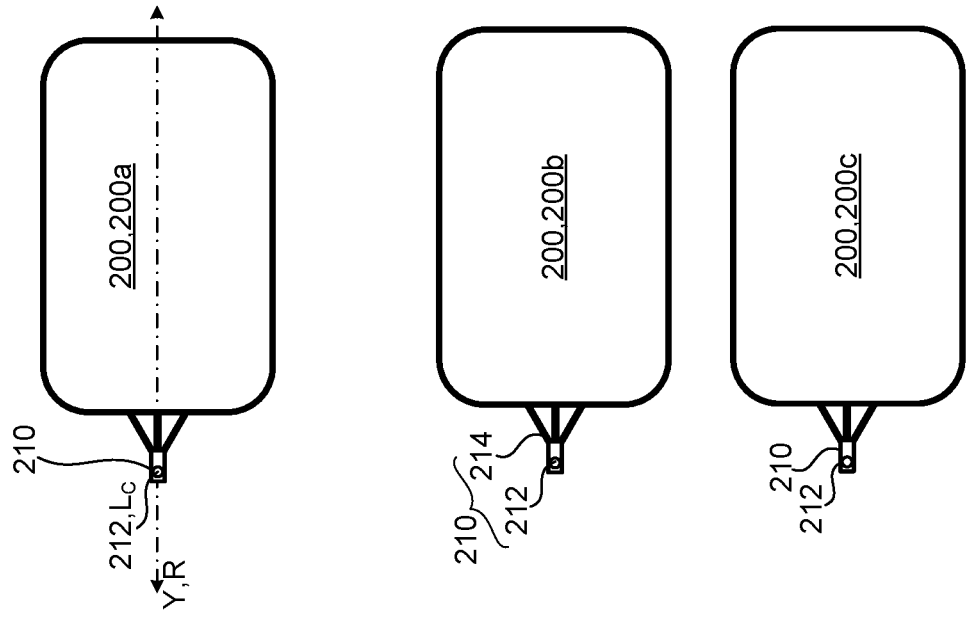
FIG. 1 is a schematic top view of an exemplary tow vehicle.
Figure 1:
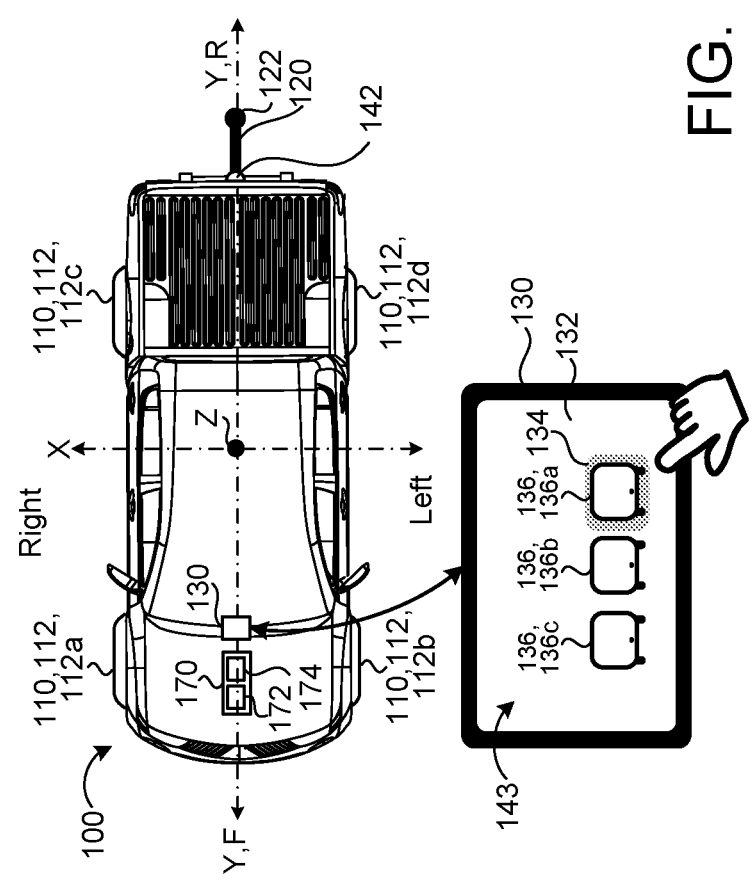
Figure 2:
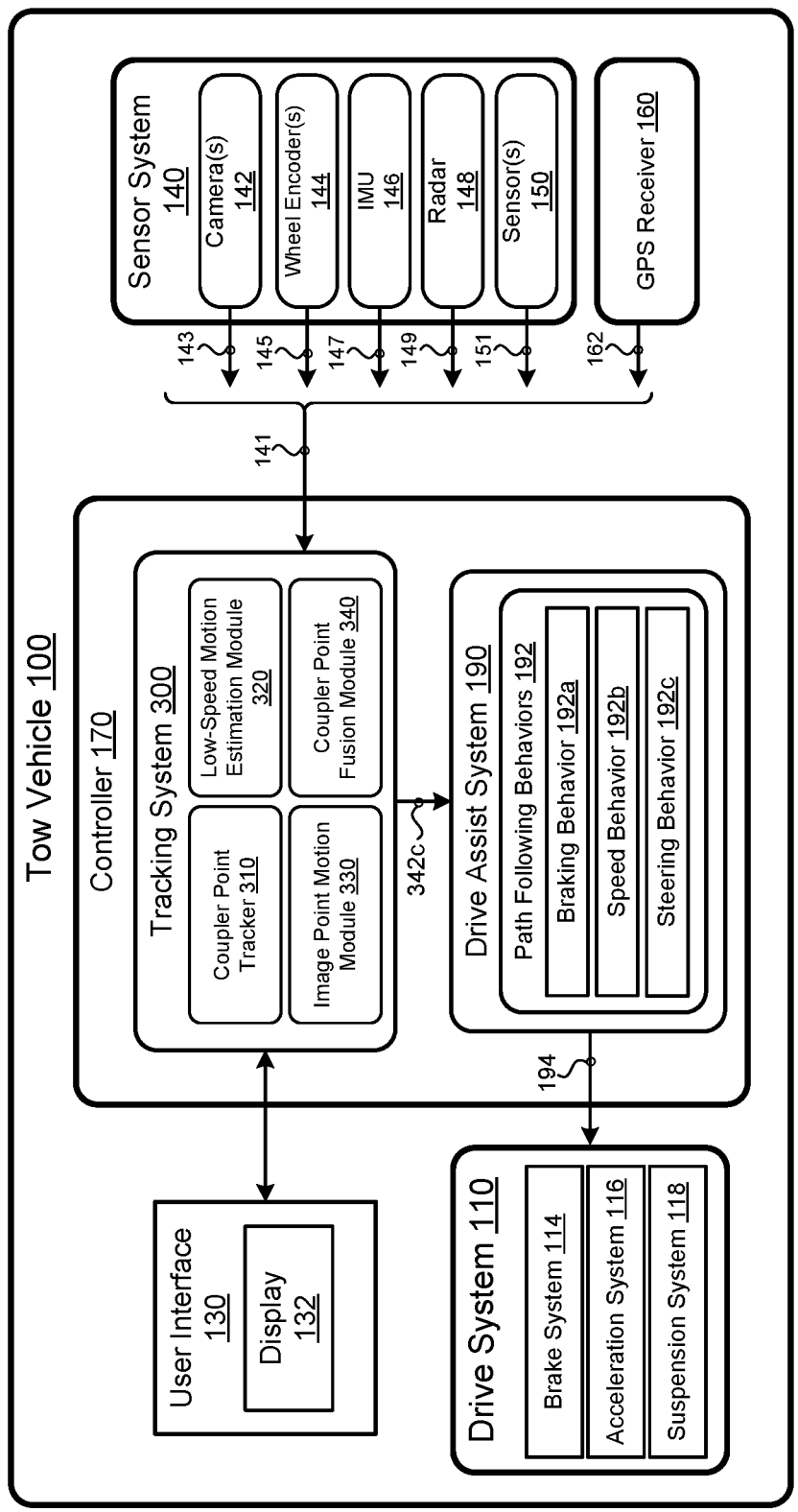
FIG. 2 is a schematic view of the tow vehicle shown in FIG. 1 including a tracking system.
Figure 3:
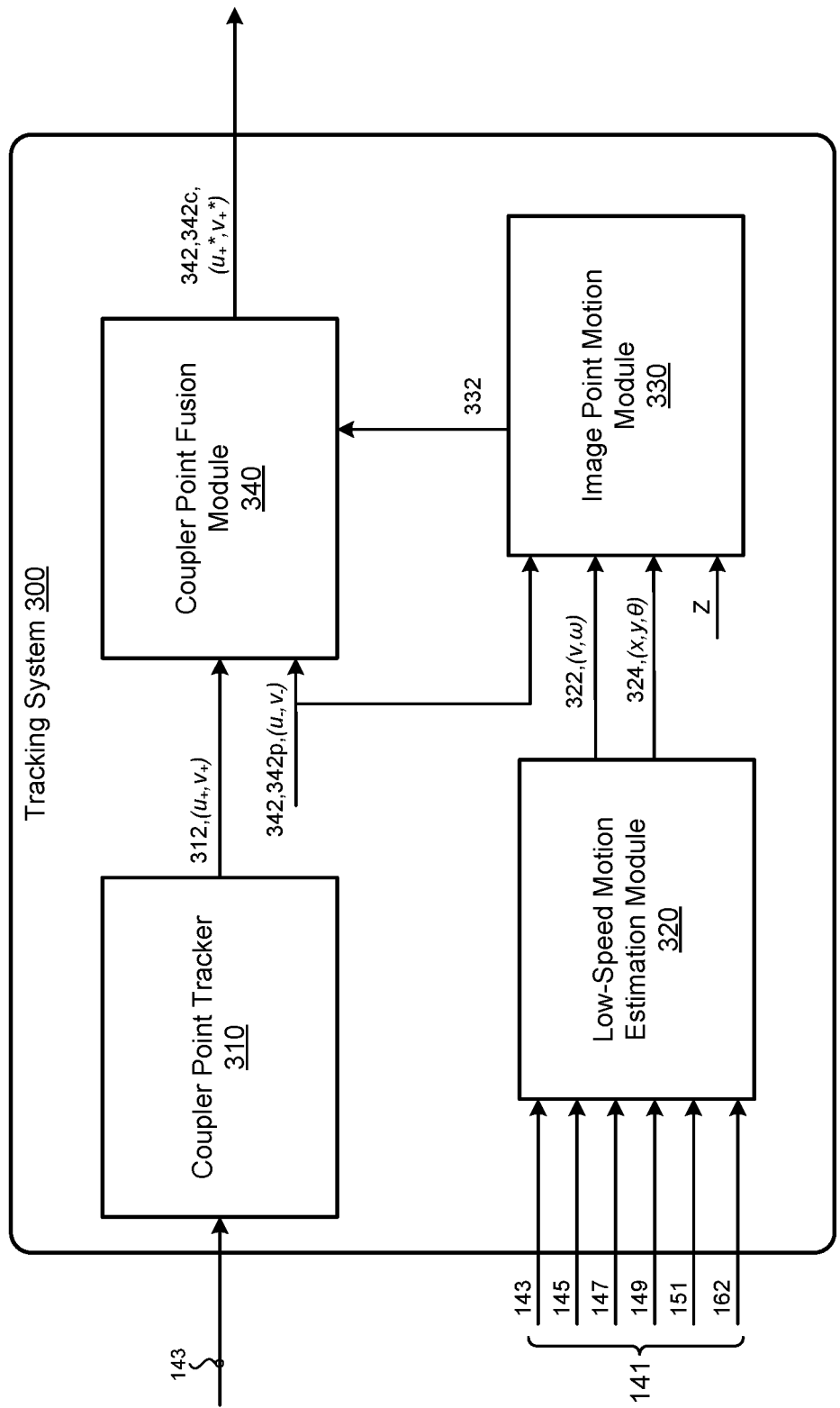
FIG. 3 is a schematic view the exemplary tracking system shown in FIG. 2.

Referring to FIGS. 1-3, in some implementations, a driver of a tow vehicle 100 wants his tow vehicle 100 to autonomously maneuver towards a trailer 200 by tracking a selected or identified trailer 200. The tow vehicle 100 may autonomously maneuver in a rearward direction R towards the trailer 200. When the tow vehicle 100 and the trailer 200 are aligned, the tow vehicle 100 may be hitched (e.g., by way of the driver or autonomously) with the trailer 200. In some examples, the tow vehicle 100 includes a tow hitch 120 having a tow ball 122. The trailer 200 includes a trailer hitch 210 that includes a trailer coupler 212 and a tow bar 214. Therefore, the tow ball 122 is coupled with the trailer coupler 212. The tow vehicle 100 may include a drive system 110 that maneuvers the tow vehicle 100 across a road surface based on drive commands having x, y, and z components, for example. As shown, the drive system 110 includes a front right wheel 112, 112a, a front left wheel 112, 112b, a rear right wheel 112, 112c, and a rear left wheel 112, 112d. The drive system 110 may include other wheel configurations as well. The drive system 110 may also include a brake system 114 that includes brakes associated with each wheel 112, 112a-d, and an acceleration system 116 that is configured to adjust a speed and direction of the tow vehicle 100. In addition, the drive system 110 may include a suspension system 118 that includes tires associates with each wheel 112, 112a-d, tire air, springs, shock absorbers, and linkages that connect the tow vehicle 100 to its wheels 112, 112a-d and allows relative motion between the tow vehicle 100 and the wheels 112, 112a-d. The suspension system 118 may be configured to adjust a height of the tow vehicle 100 allowing a tow hitch 120 (e.g., a tow hitch ball 122) to align with a trailer hitch 210 (e.g., trailer hitch coupler 212), which allows for autonomous connection between the tow vehicle 100 and the trailer 200.

The tow vehicle 100 may move across the road surface by various combinations of movements relative to three mutually perpendicular axes defined by the tow vehicle 100: a transverse axis X, a fore-aft axis Y, and a central vertical axis Z. The transverse axis x extends between a right side and a left side of the tow vehicle 100. A forward drive direction along the fore-aft axis Y is designated as F, also referred to as a forward motion. In addition, an aft or rearward drive direction along the fore-aft direction Y is designated as R, also referred to as rearward motion. When the suspension system 118 adjusts the suspension of the tow vehicle 100, the tow vehicle 100 may tilt about the X axis and or Y axis, or move along the central vertical axis Z.

The tow vehicle 100 may include a user interface 130. The user interface 130 may include the display 132, a knob, and a button, which are used as input mechanisms. In some examples, the display 132 may show the knob and the button. While in other examples, the knob and the button are a knob button combination. In some examples, the user interface 130 receives one or more driver commands from the driver via one or more input mechanisms or a touch screen display 132 and/or displays one or more notifications to the driver. The user interface 130 is in communication with a vehicle controller 170, which is in turn in communication with a sensor system 140. In some examples, the display 132 displays an image of an environment of the tow vehicle 100 leading to one or more commands being received by the user interface 130 (from the driver) that initiate execution of one or more behaviors. In some examples, the user display 132 displays a representation image of the rearward environment of the tow vehicle 100 that include one or more representations 136, 136a-c of trailers 200, 200a-c positioned behind the tow vehicle 100. In this case, the driver makes a selection 134 of a representation 136, 136a-c of a trailer 200, 200a-c indicative of the trailer 200 that the driver wants the vehicle to autonomously driver towards.

The tow vehicle 100 may include a sensor system 140 to provide reliable and robust driving. The sensor system 140 may include different types of sensors that may be used separately or with one another to create a perception of the environment of the tow vehicle 100 that is used for the tow vehicle 100 to autonomously drive and/or aid the driver in make intelligent decisions based on objects and obstacles detected by the sensor system 140. The sensor system 140 provides data 141, such as measurements of motion of the tow vehicle 100 which are used to calculate expected changes in specific points (e.g., trailer coupler 212) in the camera image 143, by using known camera and vehicle parameters. If the object being tracked (e.g., trailer coupler 212) is stationary, then the only motion in the image 143 is due to the movement of the tow vehicle 100, and the tracking system 300 can determine how the coupler location 312 in the next image 143 will change.

The sensor system 140 may include one or more cameras 142 supported by the tow vehicle 100. In some implementations, the tow vehicle 100 includes a rear camera 142 that is mounted to provide a view of a rear-driving path for the tow vehicle 100. The rear camera 142 may include a fisheye lens that includes an ultra wide-angle lens that produces strong visual distortion intended to create a wide panoramic or hemispherical image. Fisheye cameras capture images having an extremely wide angle of view. Moreover, images captured by the fisheye camera have a characteristic convex non-rectilinear appearance. Other types of cameras may also be used to capture images of the rear environment of the tow vehicle 100.

In some examples, the sensor system 140 also includes one or more wheel encoders 144 associated with one or more wheels 112, 112a-d of the tow vehicle 100. The wheel encoder 144 is an electro-mechanical device that converts an angular position or motion of the wheel to analog or digital output signals. Therefore, the wheel encoder 144 determines the speed and distance the wheel 112, 112a-d has traveled.

The sensor system 140 may also include an inertial measurement unit (IMU) 146 configured to measure the vehicle's linear acceleration (using one or more accelerometers) and rotational rate (using one or more gyroscopes). In some examples, the IMU 146 also determines a heading reference of the tow vehicle 100. Therefore, the IMU 146 determines the pitch, roll, and yaw of the tow vehicle 100.

In some implementations, the sensor system 140 includes radar sensors 148 configured to determine a range, angle, or velocity of objects. The radar sensors 148 transmit radio signals and measure the time it takes for a reflection of the transmitted signal to return. The radar sensors 148 determines a distance to the object as one-half the round-trip time multiplied by the speed of the signal. The radar sensors 148 may also determine a speed of the tow vehicle 100. The speed may be based on a distance from the radar sensors 148 to the object at a first time, and a distance from the radar sensors 148 to the object at a second time. Therefore, the radar sensors 148 may determine the speed based on a difference between the distances at the first and second time divided by the difference between the first and second time.

The sensor system 140 also includes other sensors 150 that detect the vehicle motion, i.e., speed, angular speed, position, etc. The other sensors 105 may include, but are not limited to, steering wheel sensors, sonar, LIDAR (Light Detection and Ranging, which can entail optical remote sensing that measures properties of scattered light to find range and/or other information of a distant target), LADAR (Laser Detection and Ranging), ultrasonic, etc.

In some implementations, the tow vehicle 100 includes a Global positioning system (GPS) receiver 160 that receives information from GPS satellites and then calculates a geographical position 162 of the tow vehicle 100.

In some implementations, the vehicle controller 170 includes a computing device (or processor) 172 (e.g., central processing unit having one or more computing processors) in communication with non-transitory memory 174 (e.g., a hard disk, flash memory, random-access memory, memory hardware) capable of storing instructions executable on the computing processor(s) 172.

The vehicle controller 170 executes a tracking system 300 that analyzes the received images 143 and identifies a trailer coupler 212 within the image 143 and tracks the trailer coupler 212 as the tow vehicle 100 is moving in the rearward direction R. The tracking system 300 includes a coupler point tracker 310, a low-speed motion estimation module 320, an image point motion module 330, and a coupler point fusion module 340. The tracking system 300 provides an improved determination of the coupler location $L_C$ by fusing the data 312 of the coupler point tracker 310 within the image 143 and the camera motion determined by the low-speed motion estimation module 320.

Referring to FIG. 3, in some implementations, the coupler point tracker module 310 receives an image 143 from the rear camera 142. The coupler point tracker 310 identifies the trailer coupler 212 within the image 143 and tracks the coupler 212 in subsequently received images 143. Therefore, the coupler point tracker 310 determines a current coupler location 312, (u+, v+) in the current image 143. The coupler location 312 in the image is defined by (u, v), where u is the pixel position along an x-image axis of the image, and v is the pixel position along a y-image axis of the image.

The low-speed motion estimation module 320 receives sensor data 141 from one or more sensors 142, 144, 146, 148, 150 of the sensor system 140. In some examples, the low-speed motion estimation module 320 receives one or more of an image(s) 143 from the camera 142, wheel ticks 145 from the wheel encoder(s) 144, IMU data 147 from the IMU 146, radar data 149 from the radar 148, and other sensor data 151 from the other sensors 150. In some examples, the low-speed motion estimation module 320 receives GPS data 162 from the GPS receiver 160. In some examples, the low-speed motion estimation module 320 determines a vehicle linear speed and angular speed 322, (v, ω) (where v is the linear speed and ω is the angular speed) of the tow vehicle 100 and a vehicle pose 324, (x, y, θ) based on the received sensor data 141. The vehicle pose 324 is defined by (x, y, θ) where x is the position of a center of the tow vehicle 100 along the transverse axis X in and X-Y plane, y is the position of a center of the vehicle along the fore-aft axis Y in the X-Y plane, and θ is the heading of the tow vehicle 100. The low-speed motion estimation module 320 may also determine camera motion information, such as a camera velocity and a position of the camera (camera pose), based on the vehicle linear and angular speed 322, (v, ω) and the vehicle pose 324 (x, y, θ), since the camera motion is directly related to the vehicle motion as the camera 142 is supported by the tow vehicle 100. In other examples, the low-speed motion estimation module 320 determines the camera motion and based on the camera motion the low-speed motion estimation module 320 determines the vehicle linear and angular speed 322, (v, ω) and the vehicle pose 324, (x, y, θ).

In some implementations, the image point motion module 330 estimates a pixel velocity 332 of the pixels associated with the coupler 212 within one or more images 143. The image point motion module 330 provides the tracking system 300 with an estimate of where the coupler 212 will be (i.e., move to) in the next image 143. The image point motion module 330 receives the vehicle linear and angular speed 322, (v, ω) and the vehicle pose 324, (x, y, θ) from the low-speed motion estimation module 320. In addition, the image point motion module 330 receives or determines a coupler height Z. The coupler height Z may be entered by way of the user interface 130 by the driver, or calculated, for example, as explained with respect to FIG. 5. The image point motion module 330 also receives a previous coupler location 342p associated with a previous image 143. In some examples, each current coupler location 342c, (u+*, v+*) is stored in hardware memory 174 and associated with a timestamp. Therefore, when a new current coupler location 342c is determined, the previously stored current coupler location 342c becomes the previous coupler location 342p. Based on the received vehicle linear and angular speed 322, (v, ω) and the vehicle pose 324, (x, y, θ), the coupler height Z, and the previous coupler location 342p, the image point motion module 330 determines the pixel velocity 332 of pixels associated with the coupler 212 within the one or more images 143.

In some examples, the image point motion module 330 determines the coupler location $L_c$ in the real word as (X, Y, Z). The image point motion module 330 may determine the coupler's position (u, v) in the image 143 by:

$$(u,v)=f(x,y,\theta,X,Y,Z) \qquad (1)$$

Where (u, v) is the coupler location, the vehicle pose is defined by x, y, θ, and the coupler location $L_c$ in the world is define by X, Y, Z. Therefore, the coupler location (u, v) is a function of the vehicle pose 324, (x, y, θ) and the coupler location $L_c$, (X, Y, in the real-world coordinates.

The image point motion module 330 inverts the equation (1) to determine the vehicle location (X, Y) in an x-y plane as a function of the coupler location (u, v) in the image and the coupler height Z in real world. In some examples, the coupler height Z is within a range (e.g., between 40 centimeters and 70 centimeters).

$$(X,Y)=f^{-1}(x,y,\theta,u,v,Z) \qquad (2)$$

Following, the image point motion module 330 calculates a Jacobian matrix of the function from the first equation (1). The low-speed motion estimation module 320 determines the velocity of an image point or a pixel velocity 332, (u̇, v̇), i.e., the velocity of the coupler pixels within the image, based on the Jacobian matrix (3).

$$\begin{bmatrix} \dot{u} \\ \dot{v} \end{bmatrix} = [Df(x, y, \theta, X, Y, X)] \begin{bmatrix} \dot{x} \\ \dot{y} \\ \dot{\theta} \\ \dot{X} \\ \dot{Y} \\ \dot{Z} \end{bmatrix} \quad (3)$$

Where $\dot{u}$ is the change of pixel position with respect to the change in time, $\dot{v}$, is the change of pixel position with respect to the change in time. $\dot{x}=v \cos \theta$; $\dot{y}=v \sin \theta$; $\dot{\theta}=\omega$; and $\dot{X}=\dot{Y}=\dot{Z}=0$.

In some implementations, the coupler point fusion module 340 determines an updated coupler point location 342c in the current image 143 based on the coupler pixel velocity 332, ($\dot{u}$, $\dot{v}$) and a previously determined coupler point location 342p (previously determined by the coupler point fusion module 340 and stored in memory hardware 174). In other words, the coupler point fusion module 340 updates the coupler point location 312, (u+, v+) determined by the coupler point tracker 310 in a current image 143 based on the coupler pixel velocity 332, ($\dot{u}$, $\dot{v}$) and a previously determined coupler point location 342p to determine the updated coupler location 342c in the current image 143. As such, the tracking system 300 improves the coupler location 342c determination by combining image pixel velocity 332, the coupler location 342p in previous images 143, and the coupler location 312 based on the coupler point tracker 310.

In some implementations, the controller 170 executes the tracking system 300 for each received image 143 so that the tow vehicle 100 autonomously maneuvers in the rearward direction R based on the updated coupler location 342p thus aligning with the tow bar 214 supporting the coupler 212 for hitching.

The vehicle controller 170 executes a drive assist system 190, which in turn includes path following behaviors 192. The path following behaviors 192 receive the current coupler location 342c in the current image 143 and executes one or more behaviors 192a-b that send commands 194 to the drive system 110, causing the tow vehicle 100 to autonomously drive in the rearward direction R towards the coupler location 342c in the current image 143, which causes the tow vehicle 100 to autonomously connect to the trailer 200. In some examples, the controller 170 determined a real world position of the coupler location 342c in the current image 143, such that the drive assist system 190 follows the real world coordinate of the coupler location $L_C$.

The path following behaviors 192 include, a braking behavior 192a, a speed behavior 192b, and a steering behavior 192c. In some examples, the path following behaviors 192 also include a hitch connect behavior, and a suspension adjustment behavior. Each behavior 192a-192c causes the tow vehicle 100 to take an action, such as driving backward, turning at a specific angle, breaking, speeding, slowing down, among others. The vehicle controller 170 may maneuver the tow vehicle 100 in any direction across the road surface by controlling the drive system 110, more specifically by issuing commands 194 to the drive system 110.

The braking behavior 192a may be executed to either stop the tow vehicle 100 or to slow down the tow vehicle 100 based on the coupler location 342c in the current image 143. The braking behavior 192a sends a signal or command 194 to the drive system 110, e.g., the brake system (not shown), to either stop the tow vehicle 100 or reduce the speed of the tow vehicle 100.

The speed behavior 192b may be executed to change the speed of the tow vehicle 100 by either accelerating or decelerating based on the planned path. The speed behavior 192b sends a signal or command 194 to the brake system 114 for decelerating or the acceleration system 116 for accelerating.

The steering behavior 192c may be executed to change the direction of the tow vehicle 100 based on the coupler location 342c in the current image 143. As such, the steering behavior 192c sends the acceleration system 116 a signal or command 194 indicative of an angle of steering causing the drive system 110 to change direction.

Figure 4:
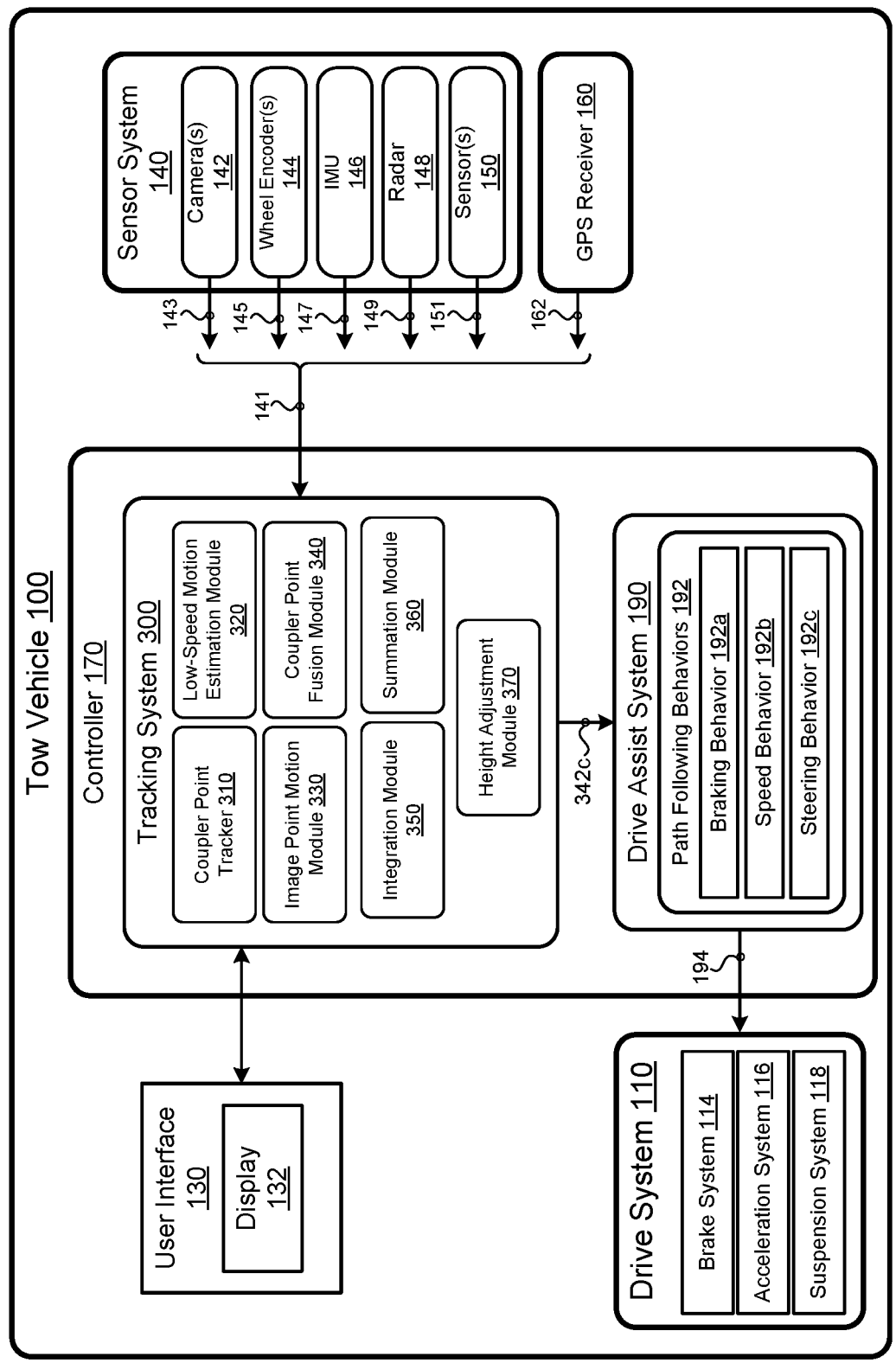
FIG. 4 is a schematic view of an exemplary tow vehicle.
Figure 5:
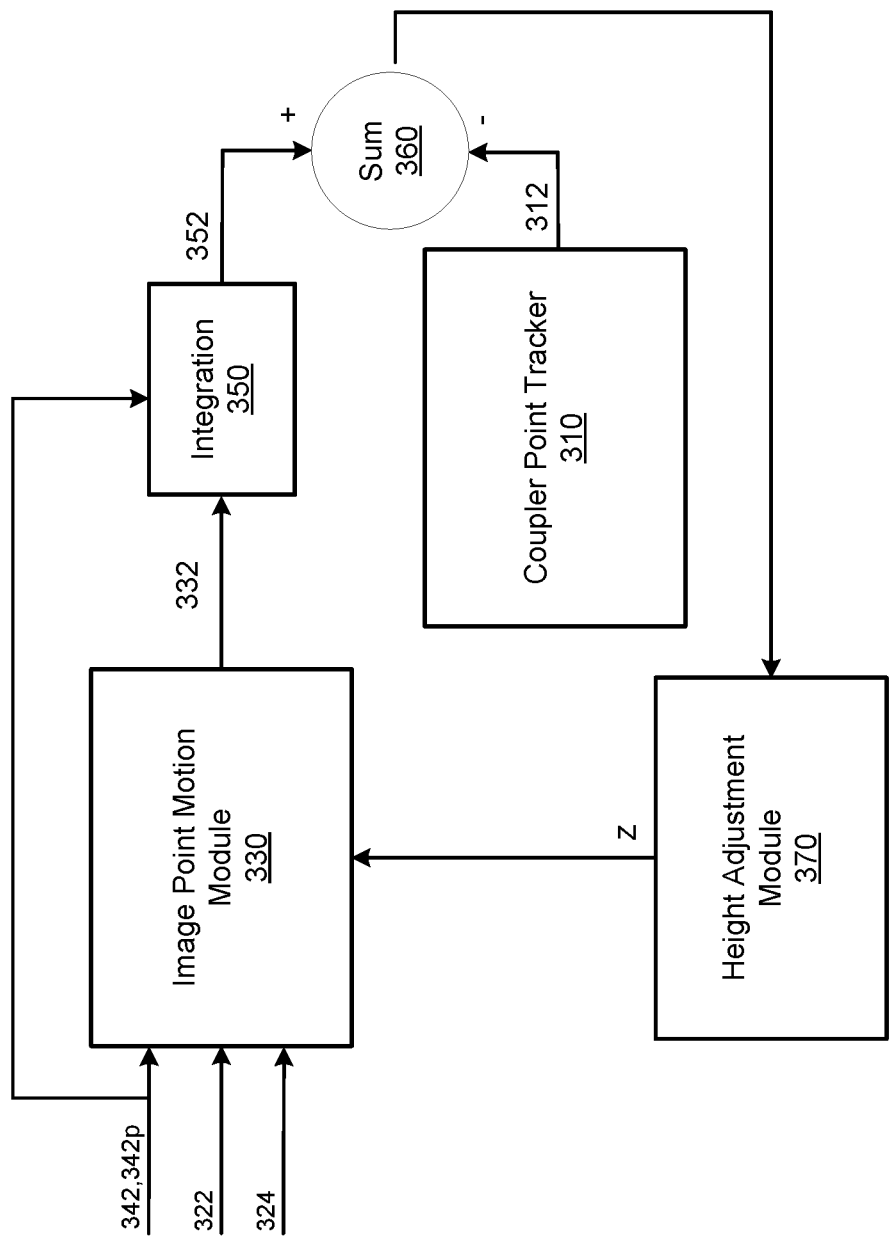
FIG. 5 is a schematic view of the tow vehicle shown in FIG. 4 including a height adjustment module.

Referring to FIGS. 4 and 5, in some implementations, the tracking system 300 includes an integration module 350, a summation module 360, and a height adjustment module 370 which are used together to determine the height Z of the trailer coupler 212 in world coordinate system. The integration module 350, the summation module 360, and the height adjustment module 370 may be stand-alone modules or part of the coupler point fusion module 340. The integration module 350 receives the image pixel velocity 332, ($\dot{u}$, $\dot{v}$) (i.e., the image derivative) from the image point motion module 330 and outputs a pixel point or location 352 based on the pixel speed determined from the pixel velocity 332. In some examples, the integration module 350 determines the pixel point 352 by integrating the received pixel velocity 332.

In some examples, under benign conditions (e.g., good lighting without sharp shadow lines, or misleading image features, etc.), the coupler point tracker 310 accurately follows one or more image pixel points over time from image frame to image frame. The coupler point tracker 310 may (self-) report some measure of estimated quality of their tracking performance.

During a period when the coupler point tracker 310 is performing well (by its self-reported quality measure or some other means), its output 312 may be compared to the output of the image point motion module 330. Both the coupler point tracker 310 and the image point motion module 330 report the location of a feature in the world (i.e., the trailer coupler 212) within the image 143. Therefore, the output of the coupler point tracker 310 and the output of the image point motion module 330 may be directly compared to one another by the summation module 360. If both outputs 312, 352 are the same, then the height Z of the coupler 212 in the real world is accurate. However, if the outputs 312, 352 are not the same, then the height adjustment module 370 adjusts the height Z of the coupler 212. In an initial step, the height adjustment module 370 may select a coupler height Z between 40 centimeters and 70 centimeters from the road surface, and based on the output of the summation module 360, the height adjustment module 370 adjusts the height Z of the coupler 212. In some examples, the selection of the coupler height Z may be varied between the limits until the outputs 312, 352 are the same. Once the height Z is adjusted, in a next captured image 143, the image point motion module 330 determines the pixel velocity 332 by considering the adjusted height Z.

The image point motion module 330 relies on the height Z of the point in the world (i.e., the trailer coupler 212) to be known, while the coupler point tracker 310 does not rely on the height Z. Therefore, the tracking system 300 determines the coupler height Z, for example, by way of pre-entered, user entered, or calculated. In some examples, by comparing the output 312 of the coupler point tracker 310 and the output 332 of the image point motion module 330 under benign conditions for the coupler point tracker 310 and adjusting the height input Z of the image point motion module 330 until its output 332 matches the output 312 of the coupler point tracker 312. As such, the system 300 can estimate the height Z of the feature (i.e., the trailer coupler 212) being used in real world.

In some implementations, when conditions for the coupler point tracker 310 are not benign, the system 300 can better make use of the image point motion module 330 to improve the performance of the tracking.

The tracking system 300 fuses the image 143 with vehicle dynamics, i.e., sensor data 141, to predict a position of a coupler point within the image 143 and in world coordinate. By incorporating vehicle motion, the position of the stationary objects (with respect to the world) within the image may be determined in future image frames.

Figure 6:
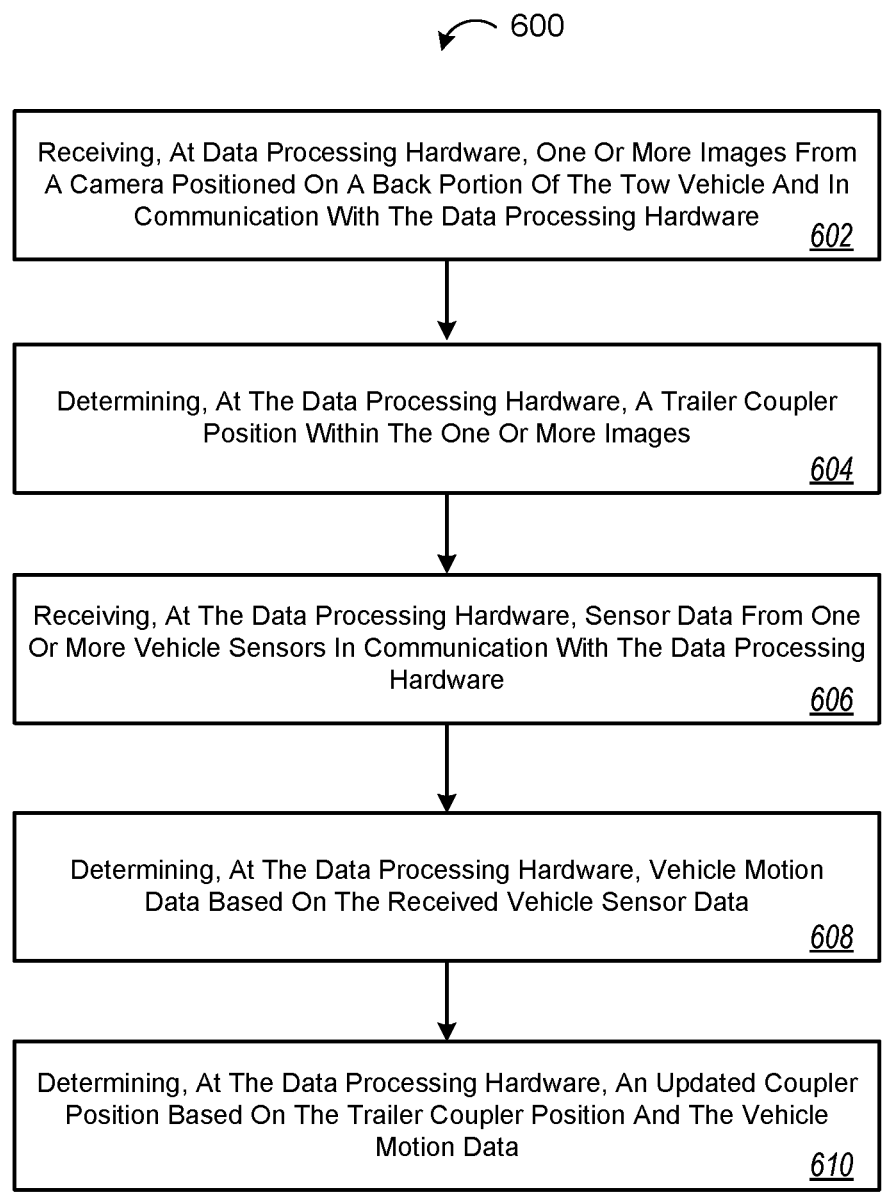
FIG. 6 is a schematic view of an exemplary method for tracking a coupler of a trailer positioned behind a tow vehicle.

FIG. 6 provides an example arrangement of operations of a method 600 for of tracking a trailer coupler 212 positioned behind a tow vehicle 100 using the system described in FIGS. 1-5. At block 602, the method 600 includes receiving, at data processing hardware 172, one or more images 143 from a camera 142 positioned on a back portion of the tow vehicle 100 and in communication with the data processing hardware 172. At block 604, the method 600 includes determining, at the data processing hardware 172, a trailer coupler position 312 within the one or more images 143. The trailer coupler position 312 is associated with the trailer coupler 212. Therefore, the trailer coupler position 312 is a pixel position within the images 143. At block 606, the method 600 includes receiving, at the data processing hardware 172, vehicle sensor data 141 from one or more vehicle sensors 142, 144, 146, 148, 150, 160 in communication with the data processing hardware 172. The one or more vehicle sensors may include, but are not limited to, a steering wheel angle sensor, wheel encoders, inertial measuring unit, radar, and global positioning system receiver.

Additionally, at block 608 the method 600 includes determining, at the data processing hardware 172, vehicle motion data 322, 324 based on the received vehicle sensor data 141. The vehicle motion data 322, 324 may include, a vehicle linear and angular speed 322 and a vehicle pose 324. At block 610, the method 600 also includes determining, at the data processing hardware 172, an updated coupler position 342c of a current image based on the trailer coupler position 312 and the vehicle motion data 322, 324.

In some implementations, the method 600 includes determining a pixel velocity 332, (u̇, v̇) of one or more points of the trailer coupler 212 within the one or more images 143 based on the vehicle motion data 322, 324 and a previous coupler position 342p. The updated coupler position 342c is based on the pixel velocity and the previous coupler position. The pixel velocity 332, (u̇, v̇) may be based on a coupler height Z in a real-world coordinate system. The method 600 may also include determining the coupler height Z from a predetermined range (e.g., 40-70 centimeters). The method also includes determining a first pixel point location 352 associated with the trailer coupler 212 based on the pixel velocity 332, (u̇, v̇), and determining a second pixel point location 312 associated with the trailer coupler 212 based on the one or more images 143. The method 600 also includes comparing the first pixel point location 352 and the second pixel point location 312 and adjusting the coupler height Z based on the compared first and second pixel point locations 352, 312.

In some implementations, the method 600 includes storing, at memory hardware 174 in communication with the data processing hardware 172, the updated coupler position 342c, and retrieving the updated coupler position 342c as the previous coupler position 342p when one or more updated images 143 are received.

In some examples, the method 600 also includes determining a coupler location $L_C$ in a world coordinate based on the updated coupler position 342c. The method 600 may include transmitting instructions 194 to a drive system 110 of the tow vehicle 100. The instructions 194 causing the tow vehicle 100 to autonomously maneuver in a rearward direction R towards the coupler location $L_C$.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims.

What is claimed is:

1. A method for tracking a trailer coupler positioned behind a tow vehicle, the method comprising:
   receiving, at data processing hardware, one or more images from a camera positioned on a back portion of the tow vehicle and in communication with the data processing hardware;
   determining, at the data processing hardware, a trailer coupler position within the one or more images, the trailer coupler position associated with the trailer coupler;
   receiving, at the data processing hardware, vehicle sensor data from one or more vehicle sensors in communication with the data processing hardware;
   determining, at the data processing hardware, vehicle motion data based on the received vehicle sensor data;
   determining, at the data processing hardware, an updated coupler position based on the trailer coupler position and the vehicle motion data; and
   determining a pixel velocity of the trailer coupler within the one or more images based on the vehicle motion data and a previous coupler position;
   wherein the updated coupler position is based on the pixel velocity and the previous coupler position.

2. The method of claim 1, wherein the vehicle motion data includes a vehicle pose, a vehicle linear speed, and a vehicle angular speed.

3. The method of claim 1, wherein the one or more vehicle sensors include at least one of a steering wheel angle sensor, wheel encoders, inertial measuring unit, radar, and global positioning system receiver.

4. The method of claim 1, wherein the pixel velocity is based on a coupler height in a real-world coordinate system.

5. The method of claim 4, further comprising:
   determining the coupler height from a predetermined range;
   determining a first pixel point location associated with the trailer coupler based on the pixel velocity;
   determining a second pixel point location associated with the trailer coupler based on the one or more images;
   comparing the first pixel point location and the second pixel point location; and
   adjusting the coupler height based on the compared first and second pixel point locations.

6. The method of claim 1, further comprising:
   storing, at memory hardware in communication with the data processing hardware, the updated coupler position; and
   retrieving the updated coupler position as the previous coupler position when one or more updated images are received.

7. The method of claim 1, further comprising:
   determining a coupler location in a world coordinate based on the updated coupler position; and
   transmitting instructions to a drive system of the tow vehicle, the instructions causing the tow vehicle to autonomously maneuver in a rearward direction towards the coupler location.

8. A system for tracking a trailer coupler positioned behind a tow vehicle, the system comprising:
   data processing hardware; and
   memory hardware in communication with the data processing hardware, the memory hardware storing instructions that when executed on the data processing hardware cause the data processing hardware to perform operations comprising:
      receiving one or more images from a camera positioned on a back portion of the tow vehicle and in communication with the data processing hardware;
      determining a trailer coupler position within the one or more images, the trailer coupler position associated with the trailer coupler;
      receiving vehicle sensor data from one or more vehicle sensors in communication with the data processing hardware;
      determining vehicle motion data based on the received vehicle sensor data;
      determining an updated coupler position based on the trailer coupler position and the vehicle motion data; and
      determining a pixel velocity of the trailer coupler within the one or more images based on the vehicle motion data and a previous coupler position;
      wherein the updated coupler position is based on the pixel velocity and the previous coupler position.

9. The system of claim 8, wherein the vehicle motion data includes a vehicle pose, a vehicle linear speed, and a vehicle angular speed.

10. The system of claim 8, wherein the one or more vehicle sensors include at least one of a steering wheel angle sensor, wheel encoders, inertial measuring unit, radar, and global positioning system receiver.

11. The system of claim 8, wherein the pixel velocity is based on a coupler height in a real-world coordinate system.

12. The system of claim 11, wherein the operations further include:
   determining the coupler height from a predetermined range;
   determining a first pixel point location associated with the trailer coupler based on the pixel velocity;
   determining a second pixel point location associated with the trailer coupler based on the one or more images;
   comparing the first pixel point location and the second pixel point location; and adjusting the coupler height based on the compared first and second pixel point locations.

13. The system of claim 8, wherein the operations further include:
   storing the updated coupler position at the memory hardware; and
   retrieving the updated coupler position as the previous coupler position when one or more updated images are received.

14. The system of claim 8, wherein the operations further include:
- determining a coupler location in a world coordinate based on the updated coupler position; and
- transmitting instructions to a drive system of the tow vehicle, the instructions causing the tow vehicle to autonomously maneuver in a rearward direction towards the coupler location.

\* \* \* \* \*